(12) United States Patent
Lummes et al.

(10) Patent No.: US 10,401,162 B2
(45) Date of Patent: Sep. 3, 2019

(54) CALIBRATION OF MEASUREMENT PROBES

(71) Applicant: RENISHAW PLC, Wotton-under-Edge, Gloucestershire (GB)

(72) Inventors: Stephen Edward Lummes, Stroud (GB); Mark Cole, Cam (GB)

(73) Assignee: RENISHAW PLC, Wotton-under-Edge (GB)

( * ) Notice: Subject to any disclaimer, the term of this patent is extended or adjusted under 35 U.S.C. 154(b) by 218 days.

(21) Appl. No.: 15/305,441

(22) PCT Filed: Apr. 23, 2015

(86) PCT No.: PCT/GB2015/051204
§ 371 (c)(1),
(2) Date: Oct. 20, 2016

(87) PCT Pub. No.: WO2015/162431
PCT Pub. Date: Oct. 29, 2015

(65) Prior Publication Data
US 2017/0045357 A1 Feb. 16, 2017

(30) Foreign Application Priority Data

Apr. 23, 2014 (GB) .................................. 1407178.1
Jan. 22, 2015 (GB) ..................................... 1501100

(51) Int. Cl.
*G01B 5/012* (2006.01)
*G01B 21/04* (2006.01)
*G05B 19/401* (2006.01)

(52) U.S. Cl.
CPC ........... *G01B 21/042* (2013.01); *G01B 5/012* (2013.01); *G05B 19/401* (2013.01); *G05B 2219/37008* (2013.01)

(58) Field of Classification Search
CPC ...... G01B 7/004; G01B 7/012; B23Q 16/065; B23Q 1/52
(Continued)

(56) References Cited

U.S. PATENT DOCUMENTS

| 4,382,215 A | 5/1983 | Barlow et al. |
| 4,901,256 A | 2/1990 | McMurtry et al. |

(Continued)

FOREIGN PATENT DOCUMENTS

| CN | 101427100 A | 5/2009 |
| CN | 101432592 A | 5/2009 |

(Continued)

OTHER PUBLICATIONS

Jul. 23, 2015 International Search Report issued in International Patent Application No. PCT/GB2015/051204.
(Continued)

*Primary Examiner* — Yaritza Guadalupe-McCall
(74) *Attorney, Agent, or Firm* — Oliff PLC

(57) ABSTRACT

A machine tool is provided with a toolsetting probe mounted on a bed or table, and a workpiece-sensing probe which can be mounted in a movable spindle. Both probes are calibrated by using them to make measurements against each other. The arbitrary length of the workpiece-sensing probe is used to calibrate the toolsetting probe, rather than using a pre-calibrated artefact of known length mounted in the spindle. A stylus disc of the toolsetting probe has a pre-calibrated size or dimension, and the workpiece-sensing probe is calibrated with respect to that. This obviates the need for skilful manual calibration procedures using pre-calibrated artefacts and manual measurement tools.

18 Claims, 3 Drawing Sheets

(58) Field of Classification Search
USPC .................................................. 33/502, 503
See application file for complete search history.

(56) References Cited

U.S. PATENT DOCUMENTS

| | | | | |
|---|---|---|---|---|
| 5,647,137 | A * | 7/1997 | McMurtry | ........... B23Q 1/4876 192/139 |
| 6,470,584 | B1 * | 10/2002 | Stoodley | ................ G01B 7/004 33/503 |
| 6,519,863 | B1 * | 2/2003 | McMurtry | ............... B23Q 1/52 33/503 |
| 7,640,674 | B2 * | 1/2010 | Ferrari | ................ G01B 21/042 33/502 |
| 7,765,708 | B2 * | 8/2010 | Hellier | ................... G01B 21/04 33/503 |
| 7,866,056 | B2 | 1/2011 | Ould et al. | |
| 7,900,367 | B2 | 3/2011 | Sutherland | |
| 9,471,054 | B2 | 10/2016 | McMurtry et al. | |
| 2005/0256672 | A1 * | 11/2005 | McMurtry | ............. G01B 7/012 702/150 |
| 2007/0033819 | A1 * | 2/2007 | McFarland | ........... G01B 21/04 33/551 |
| 2009/0271996 | A1 * | 11/2009 | Ferrari | ................ G01B 21/042 33/502 |
| 2012/0150354 | A1 | 6/2012 | Rogers et al. | |
| 2017/0045357 | A1 * | 2/2017 | Lummes | ............... G01B 21/042 |
| 2017/0160077 | A1 * | 6/2017 | Featherstone | .......... G01B 11/24 |
| 2017/0167843 | A1 * | 6/2017 | Antreasyan | ........... G01B 5/008 |
| 2017/0176164 | A1 * | 6/2017 | Seitz | ...................... G01B 5/008 |
| 2017/0370690 | A1 * | 12/2017 | Held | ...................... G01B 5/012 |
| 2018/0150049 | A1 * | 5/2018 | Schranz | ............... G01B 21/042 |
| 2018/0156594 | A1 * | 6/2018 | Jansson | ................ G01B 21/047 |

FOREIGN PATENT DOCUMENTS

| | | |
|---|---|---|
| CN | 101622513 A | 1/2010 |
| CN | 102207731 A | 10/2011 |
| CN | 102483621 A | 5/2012 |
| CN | 103328919 A | 9/2013 |
| GB | 2243688 A | 11/1991 |
| JP | H04-063663 A | 2/1992 |
| JP | 2528664 B2 | 8/1996 |
| JP | H11-300580 A | 11/1999 |
| JP | 2001-259966 A | 9/2001 |
| WO | 2007/068912 A1 | 6/2007 |
| WO | 2007/122362 A1 | 11/2007 |
| WO | 2013/083860 A1 | 6/2013 |

OTHER PUBLICATIONS

Jul. 23, 2015 Written Opinion issued in International Patent Application No. PCT/GB2015/051204.

Jul. 5, 2018 Office Action issued in Chinese Patent Application No. 201580033849.1.

Feb. 12, 2019 Office Action issued in Japanese Patent Application No. 2016-564205.

* cited by examiner

CALIBRATION OF MEASUREMENT PROBES

FIELD OF THE INVENTION

This invention relates to the calibration of probes used on position determination apparatus, such as machine tools.

DESCRIPTION OF PRIOR ART

It is known to use probes for measurement on machine tools. The probes may be of the contact type, e.g. touch trigger probes which issue a trigger signal upon contact with a workpiece which is to be measured or with a tool which is to be set. A reading is taken from the scales or other position transducers of the machine tool when the trigger signal issues.

Two types of machine tool probe may be distinguished:

One type comprises probes which are used to measure workpieces, either for workpiece setup prior to machining, or for inspection of workpieces after or during machining. For example, the probe may be mounted in a movable spindle of a machine tool such as a milling machine or machining centre (a workpiece-sensing spindle probe). It is brought into a sensing relationship with the workpiece by moving the spindle.

Another type of probe is used for setting cutting tools (a toolsetting probe). For example, a toolsetting probe may be mounted on a table of a milling machine or machining centre. A cutting tool mounted in the movable spindle is set by bringing it into a sensing relationship with the toolsetting probe.

A machine tool may be fitted with one of each type of probe.

Both types of probe require calibration before use, and periodic re-calibration at intervals during use. This may involve determining datum positions or offsets in the coordinate system of the machine tool.

In the prior art, it is known to calibrate probes against artefacts of known, pre-calibrated size, shape, form etc. Such artefacts include things which have a known radius or diameter, such as spheres, ring gauges or machined bores; and things which have a known length, such as calibrated length bars, slip gauges, cutting tools of known length, etc. Such artefacts are mounted in a position on the machine tool which permits relative movement between the artefact and the probe being calibrated.

For example, to calibrate a workpiece-sensing probe mounted in a movable spindle of a machine tool, it is known in the prior art to bring the probe into a sensing relationship with a pre-calibrated artefact such as a sphere or ring gauge, which is fixed relative to the machine table. This is because the probe will be moved relative to the machine table, so it must be calibrated relative to the machine table.

Conversely, to calibrate a toolsetting probe, it is known to mount a pre-calibrated artefact such as a length bar or a cutting tool of known length in the spindle, with a fixed relationship relative to the spindle, because the toolsetting probe is being calibrated relative to the position of the spindle. The length of the pre-calibrated artefact is typically known relative to a gauge line which may for example coincide with the nose of the spindle. The spindle is moved in the Z-axis direction to bring the artefact into a sensing relationship with the toolsetting probe.

Probes of the contact type may have a deflectable stylus with a stylus tip that contacts a workpiece which is to be measured, or which contacts a cutting tool which is to be set. A stylus tip may be in the shape of a ball or (particularly for toolsetting) a cylinder, disc, cube, etc. In addition to determining datum positions using pre-calibrated artefacts as above, it is also known to use such pre-calibrated artefacts to calibrate the size (e.g. radius or diameter) of such stylus tips. The stylus tip component may be supplied to a nominal size and the actual size is determined through on-machine calibration. More commonly, even if the actual stylus tip size is known accurately as supplied, the calibration may determine an effective size dimension of the stylus tip (e.g. radius or diameter) which differs from its actual size. In a touch trigger probe, the effective size is typically smaller than the actual size of the stylus tip, in order to calibrate out the so-called "pre-travel" of the probe. Pre-travel is the constant distance travelled during the fixed time delay between the instant of actual contact with the workpiece or cutting tool, and the time at which the probe issues a trigger signal.

It is believed that the machine tool builder Haas Automation Inc has used a method of calibration which involves first calibrating a toolsetting probe in a Z-axis direction, using a pre-calibrated artefact such as a length bar or a cutting tool of known length mounted in the spindle, as described above. This sets a Z-axis datum position of the toolsetting probe. Then the effective Z-axis length of a spindle-mounted workpiece-measuring probe is calibrated by touching it against the top of the stylus tip of the calibrated toolsetting probe. The length of the spindle-mounted probe is determined from the trigger signal of the toolsetting probe.

Such known methods of calibration using pre-calibrated artefacts are quite complicated, and it may be necessary to adopt careful manual procedures e.g. using manual measurement tools such as dial test indicators to set up the artefacts and to determine the relationship to the axis of rotation of the spindle, etc. The known methods therefore require skilled personnel and take a considerable time (e.g. 30 minutes) during which time the machine tool is unproductive. For these reasons, it is common in practice that the calibration is not performed well, and/or that re-calibration at periodic intervals is neglected. This results in poor measurement accuracies and poor quality machined workpieces.

SUMMARY OF THE INVENTION

The present invention provides various methods of calibrating or datuming probes on a position determining apparatus such as a machine tool, the apparatus comprising a first part and a second part which are movable with respect to each other; a toolsetting probe mountable on the first part; and a workpiece-sensing probe mountable on the second part.

In a first such method according to the invention, the toolsetting probe is calibrated or datumed from relative movement between it and the workpiece-sensing probe. The relative movement brings the workpiece-sensing probe into a sensing relationship with the toolsetting probe, and a calibration or datum value for the toolsetting probe is taken when it reaches that sensing relationship. A dimension or size of the workpiece-sensing probe may thus be used to calibrate or datum the toolsetting probe. That may be distinguished from the prior art use of a pre-calibrated artefact such as a length bar or cutting tool having a known length relative to a gauge line on the second part (e.g. on a spindle). The dimension or size of the workpiece-sensing probe may be arbitrary.

In this first method, the probes may be contact probes, for example with deflectable workpiece-contacting or tool-contacting styli. The sensing relationship may be a contact between them. The relative movement may be in an axial direction (or a Z-axis direction) of a tool-holder or spindle of the apparatus, to which the workpiece-sensing probe is mounted.

In a second such method according to the invention, a portion or feature of the toolsetting probe has a pre-calibrated size or dimension, and the workpiece-sensing probe is calibrated or datumed with respect to that pre-calibrated size or dimension, e.g. by relative movement between the probes which brings them into a sensing relationship. The portion or feature with the pre-calibrated size or dimension may be on a movable part of the toolsetting probe. That may be distinguished from the prior art use of a pre-calibrated artefact such as a sphere or ring gauge of known size, mounted on the bed or table of a machine tool.

In this second method, the toolsetting probe may be a contact probe, and the portion or feature with the pre-calibrated size or dimension may be on a deflectable stylus of the probe. The workpiece-sensing probe may also be a contact probe, e.g. with a deflectable workpiece-contacting stylus. The sensing relationship may be a contact between them. The relative movement may be one or both directions transverse to a tool-holder or spindle of the apparatus, to which the workpiece-sensing probe is mounted.

In a third such method according to the invention, the workpiece-sensing probe and the toolsetting probe are each calibrated or datumed relative to the other. A portion or feature of one of the probes may have a pre-calibrated size or dimension, and the other probe is calibrated or datumed with respect to that pre-calibrated size or dimension, e.g. by relative movement between the probes which brings them into a sensing relationship. The portion or feature with the pre-calibrated size or dimension may be on a movable part of the respective probe. This third method may incorporate further preferred features from either or both of the first and second methods The invention also provides software programs configured to perform any of the above methods when run in a machine tool control. It also provides machine tools and machine tool controls configured to perform such methods.

BRIEF DESCRIPTION OF THE DRAWINGS

Preferred embodiments of the invention will now be described, with reference to the accompanying drawings, wherein.

DESCRIPTION OF PREFERRED EMBODIMENTS

Figure 1:
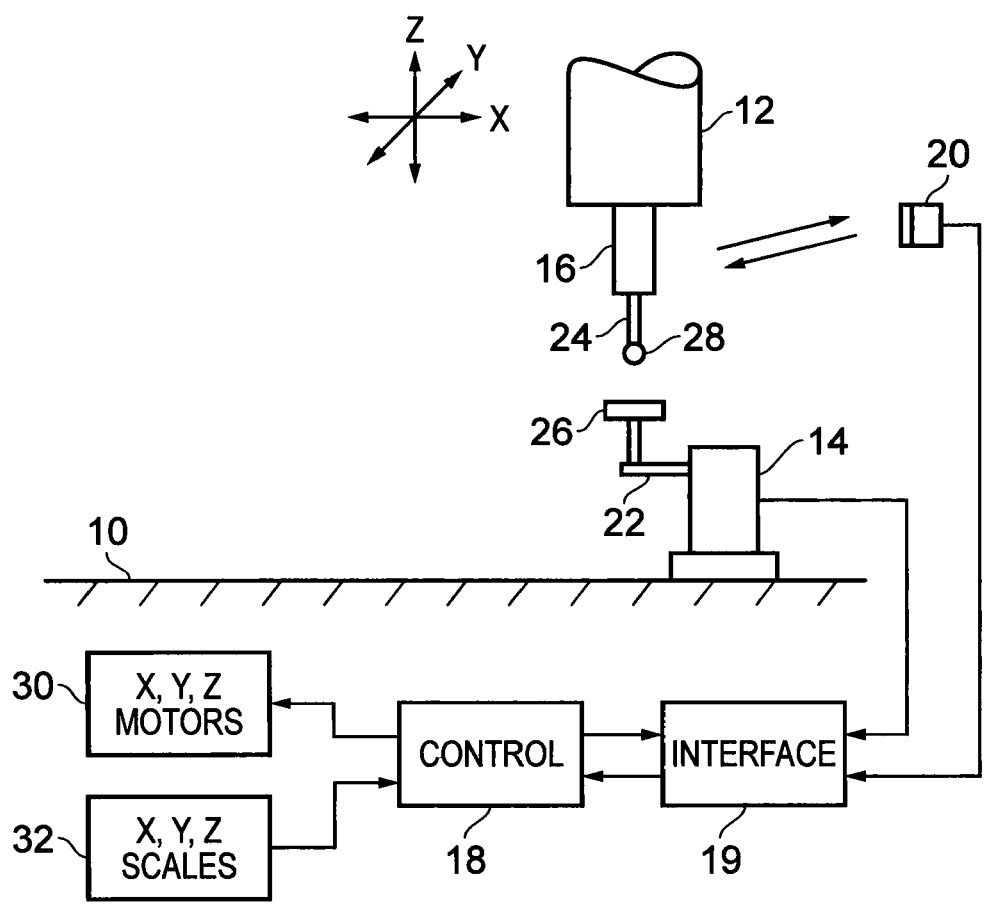
FIG. 1 shows operative parts of a machine tool diagrammatically.

FIG. 1 shows operative parts of a machine tool, comprising a bed 10 to which a workpiece may be clamped, and a rotatable spindle 12 in which a cutting tool may be mounted. The spindle 12 is movable in three axis dimensions X, Y, Z relative to the bed 10. This movement is driven by X, Y, Z motors 30, and is measured by X, Y, Z encoders or scales 32 (or other position transducers), which provide position feedback in a servo loop. The X, Y, Z movement is controlled by a program running in a control 18 of the machine tool, which typically also controls the rotary movement of the spindle 12. The control 18 may be a conventional CNC controller or a separate computer. Although a movable spindle and a fixed bed are shown, as an alternative the fixed bed may be substituted by a movable table, providing the movement in one or more of the dimensions relative to the spindle.

A toolsetting probe 14 is clamped to the bed 10. It may be used for setting cutting tools. A spindle probe 16 is mounted in the spindle 12, and is exchangeable with cutting tools by a conventional tool changer (not shown). The spindle probe 16 may be used for workpiece setup and/or for measuring workpieces. The probes 14, 16 provide signals to the control 18 of the machine tool via an interface 19. The communication between the spindle probe 16 and the interface 19 and control 18 may be provided via a wireless transceiver module 20, such as an optical or infrared or radio module, or via an inductive coupling. The toolsetting probe 14 may also communicate with the control via a wireless transceiver module if desired.

In the present example, the probes are both of the contact type. The spindle probe 16 has a stylus 24 which is biased by a spring into a rest position in the probe body and which deflects against the force of the spring when a workpiece-contacting tip 28 of the stylus contacts a workpiece. Likewise, the toolsetting probe 14 has a stylus 22 (having a cranked configuration in this example) which is biased into a rest position in the body of the probe 14 and which deflects when contacted by a cutting tool. The tool-contacting stylus tip 26 of the stylus 22 may be in any conventional form such as a cube, disc, cylinder or sphere. It has a known, pre-calibrated dimension which is preferably certified when supplied. It may have been measured on a separate measuring apparatus such as a coordinate measuring machine. This is in contrast to known stylus tips for such probes, which may have a stated nominal diameter or other dimension when supplied, but the actual or effective diameter (or other dimension) is determined as part of the calibration process on the machine tool. In the present example the stylus tip 26 of the toolsetting probe is in the form of an accurately ground disc with a known, certified pre-calibrated diameter.

The probes 14, 16 are suitably touch trigger probes which issue a trigger signal when their deflectable styli contact or are contacted by a workpiece or cutting tool. This causes the control 18 to latch the outputs of the X, Y and/or Z scales 32, as appropriate, giving readings which indicate the instantaneous relative X, Y and/or Z position of the spindle 12 and bed 10. If desired, instead of a touch trigger probe, the probe 16 may be an analogue or scanning probe providing X, Y, Z outputs measuring the amount of deflection of the stylus 24 as a result of contact with a workpiece surface.

Before use, it is required to calibrate or "datum" the probes 14, 16. This is performed by calibrating them against each other, as shown in FIGS. 2-6 and in the flow chart FIG. 7.

In an optional preliminary step 40, the user estimates or measures the approximate distance from the nose of the spindle 12 to the stylus tip 28 of the spindle probe 16, e.g. with a ruler. The result is manually entered into the control 18, and is simply a positive offset which is used to enable the control to pre-position the probe 16 in the Z direction, with the stylus tip 28 a short but arbitrary distance above the disc 26 of the toolsetting probe 14. The exact height of the spindle probe stylus tip 28 above the toolsetting probe disc 26 is not important, so the measurement in this step 40 need not be performed accurately.

Alternatively, in the optional preliminary step 40 the user may estimate or measure the distance from the bed 10 of the machine tool to the stylus tip 28 of the spindle probe 16. This is manually entered into the control 18 as a negative offset, which is used for the same purpose.

If the above pre-positioning step 40 has been omitted, the spindle 12 can be pre-positioned manually, with the spindle probe at an arbitrary height above the disc 26. However, this may take longer because of the manual positioning, and because in the next step 42 (discussed below) the spindle may need to move a greater distance at one or more relatively slow feed rates.

Figure 2:
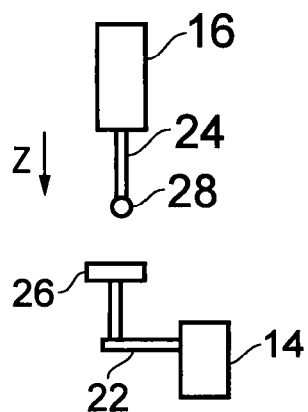
FIGS. 2-6 illustrate probes in the machine tool of FIG. 1, performing steps of a preferred method according to the invention.
Figure 3:
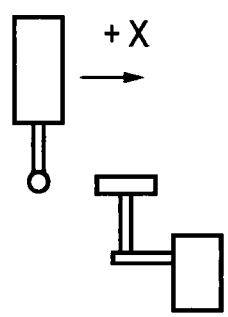
Figure 4:
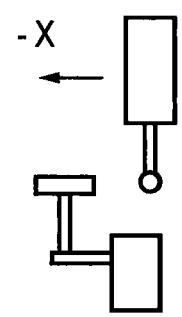

Once pre-positioned above the disc 26, as shown in FIG. 2, the control 18 runs a software macro program with the following steps. The program may be loaded and stored in the control 18 from any suitable machine-readable storage medium, e.g. a tape, CD-ROM disc or USB memory stick.

In step 42, the toolsetting probe 14 is switched on (by enabling it in the interface 19) and the spindle 12 is fed downwards in the Z direction from the position shown in FIG. 2, so that the spindle probe 16 is brought into contact with the disc 26 of the toolsetting probe 14. When the stylus tip 28 of the spindle probe 16 contacts the disc 26 of the toolsetting probe 14, the stylus 22 deflects and the toolsetting probe 14 issues a trigger signal to the control 18. This latches the Z output of the Z scale 32, and stops the movement in the Z direction. The latched Z reading from the scale is stored in the control 18 as a Z axis trigger position (in the coordinate system of the machine tool) for subsequent use as a datum position or offset during measurements.

This Z movement in step 42 should preferably take place at a feed rate corresponding to that which will subsequently be used during normal measurements. This makes it possible to calibrate out the so-called "pre-travel" (the constant distance travelled during the fixed time delay between the instant of actual contact with the disc 26 and the time at which the Z scale 32 is latched). If in practice measurements are to be made at more than one feed rate, then each feed rate will involve a different amount of pre-travel. So the step 42 should be repeated at each feed rate, and corresponding Z axis trigger positions recorded in the control 18. For example, it may be desired to set the Z length of a cutting tool both when it is rotating and when it is static (not rotating). Typically a lower feed rate would be used when rotating and a higher feed rate when not rotating. In this case, step 42 is repeated for both feed rates.

The above step 42 sets a Z-axis datum position or offset for the toolsetting probe 14, against which future measurements of the Z-axis length of cutting tools will be referenced. This datum position or offset has been set using the Z-axis length of the spindle probe 16 with its stylus 24. As already mentioned, this Z-axis length of the spindle probe is arbitrary—it need not be known. Even if it is measured in the optional step 40, this measurement can be very approximate and inaccurate, since the purpose is simply to pre-position the probe. This is in contrast to prior art methods, where the Z-axis height of the toolsetting probe is first calibrated or datumed against a length bar or cutting tool which is held in the spindle and has an accurately known length relative to a gauge line on the spindle; and where the Z-axis length of the spindle probe is then calibrated by touching it against this pre-calibrated toolsetting probe. In such prior art methods, the length bar or cutting tool of known length must be carefully set up, with accuracy commensurate with the required accuracy of the subsequent toolsetting and workpiece measurements.

Next, the toolsetting probe 14 is switched off and the spindle probe 16 is switched on (by disabling one and enabling the other in the interface 19). In step 44, the control 18 is programmed to move the spindle 12 so that the stylus tip 28 of the probe 16 is brought into contact with the sides of the disc 26 from both +X and −X directions (FIGS. 3 and 4), and also from both +Y and −Y directions (not shown). At this stage, the precise X-Y position of the disc 26 is not known, and so these movements do not take place exactly on the X and Y diameters of the disc 26. The movements take place while the probe 16 is static (not rotating) in the spindle 12.

Thus, when the stylus tip 28 of the spindle probe 16 contacts the disc 26 of the toolsetting probe 14, the stylus 24 deflects and the spindle probe 16 issues a trigger signal to the control 18. When the trigger signal is received, readings are taken from both the X and Y scales 32, at each of the four touch points in the +X, −X, +Y and −Y directions. This step 44 enables the control 18 to calculate more accurately the X and Y positions of the X, Y diameters of the disc 26. It can then pre-position the probe 16 on the X and Y diameters of the disc 26 for the next step 46. However, this step 44 could be omitted if the probe 16 can be positioned with sufficient accuracy without it.

Step 44 determines the X, Y position of the toolsetting stylus disc 26 relative to the stylus ball 28 of the spindle probe 16. However, this will not necessarily give the position of the disc relative to the axis of rotation of the spindle 12, since the probe 16 may mounted in the spindle with its stylus tip 28 off the axis of rotation.

Figure 5:
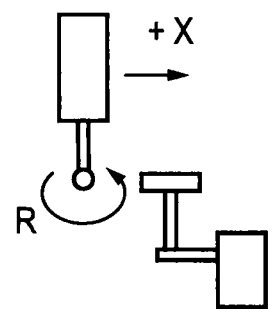
Figure 6:
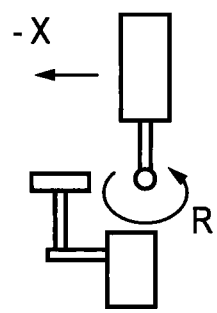
Figure 7:
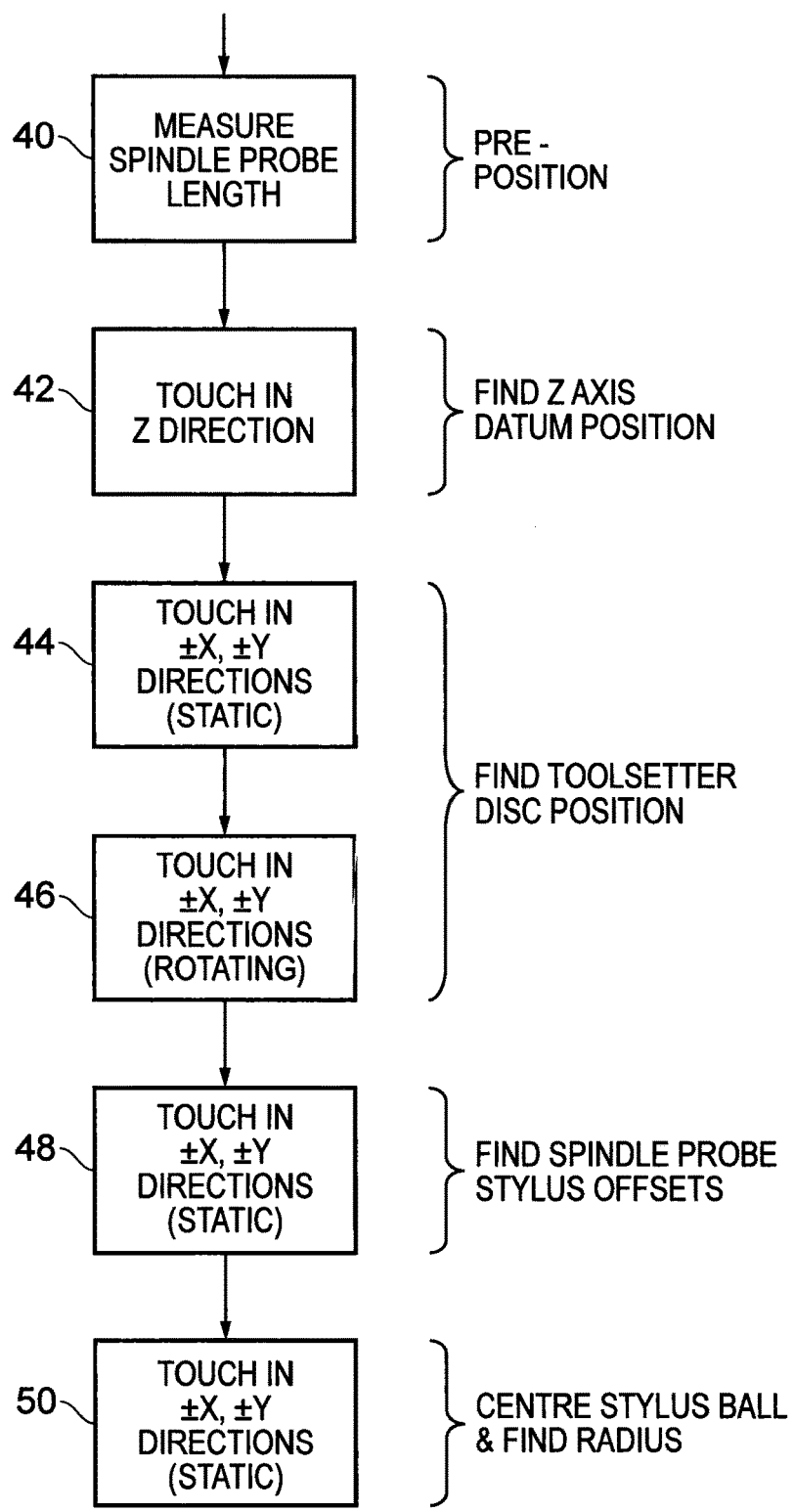
FIG. 7 is a flowchart of that preferred method.

In step 46, therefore, the probe 16 is rotated in the spindle 12, as indicated by arrows R in FIGS. 5 and 6. While continuously rotating, it is again brought into contact with the disc 26 along the diameters determined in step 44, from both +X and −X directions (as shown), and also from both +Y and −Y directions (not shown). The control 18 latches the X-Y scale readings for each contact, on receipt of the trigger signal from the probe 16. Even if the probe 16 is mounted in the spindle 12 with its stylus tip 28 off the axis of rotation, the feed rate is set sufficiently low, relative to the speed of rotation, that these X-Y scale readings are not affected by any such off-axis mounting. This step therefore enables the control 18 to determine the position of the disc 26 in the X-Y plane, relative to the true axis of rotation of the spindle 12. The centre of the disc in the X direction is determined as the midpoint between the readings taken in the +X and −X directions. The centre of the disc in the Y direction is determined as the midpoint between readings taken in the +Y and −Y directions.

Alternatively, step 46 may determine the position of the disc 26 relative to the true axis of rotation of the spindle 12 as follows. Rather than continuously rotating the spindle probe 16 while bringing it into contact with the disc, each of the readings in the +X, −X, +Y and −Y directions is taken with the probe 12 static (not rotating). However, between the +X and −X readings, the probe 12 is rotated through 180°. Likewise, it is also rotated through 180° between the +Y and −Y readings. As above, the control 18 then uses the midpoints between the readings to determine the true position of the disc 26 in the X-Y plane, relative to the true axis of rotation of the spindle 12.

This step 46 could be performed without spindle rotation if there is confidence that the stylus tip 28 is centred on the axis of rotation. However, to have such confidence would probably require manual checking and adjustment, and it is advantageous to avoid that.

The above steps calibrate the toolsetting probe 14. We now have an artefact (the pre-calibrated disc 26) which has a known size and known position in space. That is, the diameter of the disc 26 is known from its calibration value, and its X-Y position in the coordinate system of the machine tool has been determined as above, relative to the axis of rotation of the spindle 12. The spindle 12 can be aligned with the centre of the toolsetter disc 26. The toolsetting probe 14 also has a Z-axis datum position or offset as a reference when setting the Z-axis length of cutting tools against the toolsetting probe 14. These values, or offsets or datum values derived from them (e.g. relating to the +X, −X, +Y, −Y contact positions on the perimeter of the stylus disc 26) are stored in the control 18, for use when making subsequent measurements in order to set cutting tools. However, it should be noted that when the toolsetting probe 14 is triggered by a cutting tool, it will be subject to pre-travel. This can be calibrated out by adding or subtracting a constant distance determined from experience, e.g. 40 µm, to the +X, −X, +Y, −Y contact positions. Suitably the stored calibration values or offsets are adjusted by this experience value.

Next, the spindle probe 16 is calibrated. In step 48, the stylus tip 28 is again touched against the toolsetter disc 26 from both the +X and −X directions, and also from both +Y and −Y directions, with the probe 16 static (not rotating). This time, unlike FIGS. 3 and 4, the spindle 12 is aligned with the diameters of the disc 26 in the X and Y axes, as found in step 46. The X and Y scale readings are respectively latched when the probe 16 issues a trigger signal as a result of these touches. The purpose of this step is to obtain stylus offsets for use when measuring workpieces by probing them with the spindle probe 16, which are stored in the control 18. This calibrates the spindle probe 16 for X-Y measurements, at least in part.

Finally, the calibration of the spindle probe 16 is completed in step 50. This determines the effective radius or diameter of the stylus ball 28 of the spindle probe 16, and its position relative to the disc 26 of the toolsetting probe 14. It will be recalled that, in general, the mounting of the probe 16 in the spindle 12 may be such that the position of the stylus ball 28 does not coincide with the axis of rotation of the spindle 12. The measurements in step 48 take place with the axis of rotation (rather than the stylus ball 28) aligned with the disc 26, which may not enable the radius and position of the stylus ball 28 to be determined sufficiently accurately.

In step 50, therefore, once again the stylus tip 28 is touched against the toolsetter disc 26 from both the +X and −X directions, and also from both +Y and −Y directions, with the probe 16 static (not rotating). The resulting trigger signals from the spindle probe 16 are used to latch the X, Y scales 32 as previously. Assuming the control 18 takes the +X and −X readings first, it then determines the midpoint between these two readings. This gives the centre of the stylus ball 28 relative to the toolsetting disc 26, in the X direction. Next, using this information, it moves the spindle 12 to align the centre of the stylus ball 28 with the Y diameter of the disc 26, and takes the +Y and −Y readings. The midpoint between the +Y and −Y readings likewise gives the centre of the stylus ball 28 relative to the toolsetting disc 26, in the Y direction. Furthermore, the diameter of the stylus ball 28 is calculated by subtracting the known, pre-calibrated diameter of the disc 26 from the difference between the +Y and −Y readings. The effective radius of the stylus ball 28 is calculated by dividing this diameter by two.

The feed rate used in steps 48 and 50 should preferably correspond to that which will be used during probing measurements on workpieces. As described for step 42, this calibrates out the pre-travel (the constant distance travelled during the fixed time delay between the instant of actual contact with the disc 26 and the time at which the X and/or Y scale 32 is latched). The control 18 thus takes account of the pre-travel, evaluating the so-called "electronic" radius or effective radius of the stylus ball 28, rather than its physical radius. If more than one feed rate will be used during probing measurements, steps 48 and 50 should preferably be repeated at each feed rate.

Touch trigger probes commonly have different values of pre-travel when probing in different directions (vector angles) in the X-Y plane. Consequently, if different X-Y probing directions are to be used, the step 50 may be repeated for each of these directions, not only for the +X, −X, +Y and −Y directions. This gives an "electronic" or effective radius of the stylus ball corresponding to each direction (each vector angle). For example, the control may calculate and store up to 12 effective stylus radii, corresponding to 12 vector angles.

The resulting values for the radius and position of the stylus ball are used by programs in the control 18 to correct subsequent measurements of workpieces.

The method as described may be used with probes 14, 16 whose styli are biased into the rest position with fixed spring rates and spring pre-loads, set by their design or during their manufacture. It may also be used with probes whose spring rates or pre-loads are user-adjustable. The effective X-Y spring rates and/or spring pre-loads of the probes 14, 16 are preferably set relative to each other, such that in steps 44, 46, 48 and 50 the stylus 24 of the spindle probe 16 deflects in the X-Y directions before the stylus 22 of the toolsetting probe 14. This may be achieved if the stylus 22 of the toolsetting probe 14 is biased into its rest position with a significantly larger effective X-Y pre-load than the stylus 24 of the spindle probe, so that the toolsetter stylus 22 remains in its rest position during the initial X-Y deflection of the stylus 24 and triggering of the spindle probe 16. Alternatively, the respective effective X-Y spring rates of the probes may be such that the toolsetter stylus 22 deflects by only a relatively small amount as the spindle probe 12 triggers. Such a small amount of movement of the toolsetter stylus could affect the determination of the effective radius of the spindle probe stylus tip 28 in step 50. However, this can be compensated by subtracting a small constant value determined by experience (e.g. 2 µm) from the effective radius of the stylus tip 28.

On the other hand, the effective Z axis spring rates and/or pre-loads of the probes 14, 16 are preferably set relative to each other such that in step 42, the stylus 22 of the toolsetting probe 14 deflects in the Z direction before the stylus 24 of the spindle probe 16.

To determine the effective spring rates or pre-loads in a given direction, the actual spring rates and pre-loads should be considered in the light of the leverage resulting from the lengths and configurations of the styli 22, 24.

As described above, trigger signals from the toolsetting probe 14 are used for the Z-axis calibration. However, trigger signals from the spindle probe 16 may be used instead, e.g. re-arranging the relative spring rates and pre-loads of the two probes. Likewise, trigger signals from the toolsetting probe 14 may be used for the X-Y calibration, rather than trigger signals from the spindle probe 16. Again, it would be desirable to re-arrange the relative spring rates and pre-loads of the probes.

Rather than switching the probes 14, 16 on and off as described above, both could be enabled together, and the trigger signal taken from whichever probe triggers first. To achieve this, the interface 19 may comprise hardware or software which performs a logical OR function on the inputs from the two probes.

Unlike pre-calibrated artefacts in the prior art, it will be appreciated that the disc 26 is not in a fixed position relative to the machine tool bed or table 10. In fact, it is designed to move in any of the directions X, Y, Z when contacted by a cutting tool during normal toolsetting operations. However, the spring rates or pre-loads of the probes 14, 16 are set as above, such that any movement of the disc 26 during steps 46, 48 or 50 is small relative to the desired accuracy of the calibration. Alternatively, if such movement is significant, then the measured position of the disc can be compensated by subtracting or adding constant compensation values to the readings, determined in the light of experience.

Rather than using a pre-calibrated dimension on the stylus 26 of the toolsetting probe 14, it is possible to use a pre-calibrated dimension provided elsewhere on the toolsetting probe, for example the diameter of a portion of its housing.

With the exception of the optional first step 40, the above method can proceed automatically under program control, without intervention from a skilled technician. It can be completed in less than two minutes, compared to prior art methods which take 30 minutes. Even the first step 40 is easy and requires little skill, since it is just an approximate measurement with a ruler. The probes are calibrated simply by probing each of them with the other. There is no need for ancillary calibration artefacts such as pre-calibrated spheres, ring gauges, length bars or tools of known dimensions. Nor is there a need to carefully ensure that such artefacts are accurately set up or accurately centred on the rotational axis of the spindle, using manual measuring equipment such as dial test indicators.

As described above, the steps 40, 42 for calibration in the Z-axis are performed before the steps 44-50 for calibration in the X-Y axes. However, the Z-axis calibration could equally be performed after the X-Y calibration. It is also possible to perform the Z-axis calibration without the X-Y calibration, or vice versa.

The above example may be modified for application to other machine tool configurations, such as a lathe. In a lathe, the probe 16 may be mounted in a movable turret which also holds cutting tools. If the probe 16 is not mounted in a rotatable spindle, then step 46 must be performed without rotation. The toolsetting probe 14 may be mounted on a fixed bed. Alternatively, it may be mounted on a movable arm such as one of the HP series of toolsetting arms available from the present applicants Renishaw plc, which enables it to be moved into an operative position when calibration and toolsetting are required, and moved out of the way during normal machining.

The invention claimed is:

1. A method of calibrating or datuming probes on a machine tool, the machine tool comprising:
   a first part on which a workpiece is mountable;
   a second part on which a tool is mountable, the first and second parts being movable relative to each other;
   a control which controls the relative movement of the first and second parts of the machine tool;
   a toolsetting probe mountable on the first part; and
   a workpiece-sensing probe mountable on the second part;
   the method comprising:
   moving the first and second parts of the machine tool relative to each other to bring the toolsetting and workpiece-sensing probes into a sensing relationship with each other in a probing direction, a dimension or position of a first one of the probes being used to set one or more parameters of a second one of the probes in the probing direction; and
   storing the one or more parameters of the second probe in the control,
   wherein:
   a dimension of the toolsetting probe is used to set one or more parameters of the workpiece-sensing probe,
   the probing direction is an X-axis and/or Y-axis direction of the workpiece-sensing probe, and
   the one or more parameters of the workpiece-sensing probe include an effective radius or diameter of a stylus tip of the workpiece-sensing probe.

2. A non-transitory computer-readable medium storing a software program for a control of a machine tool, the software program being configured to cause the control of the machine tool to perform the method according to claim 1.

3. A control for a machine tool, comprising a memory storing a software program configured to cause the control to perform the method according to claim 1.

4. A machine tool having the control according to claim 3.

5. The method according to claim 1, wherein a size of the dimension of the toolsetting probe is pre-calibrated.

6. The method according to claim 1, wherein the dimension of the toolsetting probe is on a deflectable stylus of the toolsetting probe.

7. A method of calibrating or datuming probes on a machine tool, the machine tool comprising:
   a first part on which a workpiece is mountable;
   a second part on which a tool is mountable, the first and second parts being movable relative to each other;
   a control which controls the relative movement of the first and second parts of the machine tool;
   a toolsetting probe mountable on the first part; and
   a workpiece-sensing probe mountable on the second part;
   the method comprising:
   moving the first and second parts of the machine tool relative to each other to bring the toolsetting and workpiece-sensing probes into a sensing relationship with each other in a probing direction, a dimension or position of a first one of the probes being used to set one or more parameters of a second one of the probes in the probing direction; and
   storing the one or more parameters of the second probe in the control,
   wherein:
   a dimension of the toolsetting probe is used to set one or more parameters of the workpiece-sensing probe, and
   a trigger signal from the workpiece-sensing probe is used to set the one or more parameters of the workpiece-sensing probe from the dimension of the toolsetting probe.

8. The method according to claim 7, wherein a size of the dimension of the toolsetting probe is pre-calibrated.

9. The method according to claim 7, wherein the dimension of the toolsetting probe is on a deflectable stylus of the toolsetting probe.

10. A method of calibrating or datuming probes on a machine tool, the machine tool comprising:
    a first part on which a workpiece is mountable;
    a second part on which a tool is mountable, the first and second parts being movable relative to each other;
    a control which controls the relative movement of the first and second parts of the machine tool;
    a toolsetting probe mountable on the first part; and
    a workpiece-sensing probe mountable on the second part;
    the method comprising:

moving the first and second parts of the machine tool relative to each other to bring the toolsetting and workpiece-sensing probes into a sensing relationship with each other in a probing direction, a dimension or position of a first one of the probes being used to set one or more parameters of a second one of the probes in the probing direction; and storing the one or more parameters of the second probe in the control, wherein:

a dimension of the toolsetting probe is used to set one or more parameters of the workpiece-sensing probe, and a trigger signal from the toolsetting probe is used to set the one or more parameters of the workpiece-sensing probe from the dimension of the toolsetting probe.

11. The method according to claim 10, wherein a size of the dimension of the toolsetting probe is pre-calibrated.

12. The method according to claim 10, wherein the dimension of the toolsetting probe is on a deflectable stylus of the toolsetting probe.

13. A method of calibrating or datuming probes on a machine tool, the machine tool comprising:

a first part on which a workpiece is mountable;

a second part on which a tool is mountable, the first and second parts being movable relative to each other;

a control which controls the relative movement of the first and second parts of the machine tool;

a toolsetting probe mountable on the first part; and a workpiece-sensing probe mountable on the second part;

the method comprising:

moving the first and second parts of the machine tool relative to each other to bring the toolsetting and workpiece-sensing probes into a sensing relationship with each other in a probing direction, a dimension or position of a first one of the probes being used to set one or more parameters of a second one of the probes in the probing direction; and storing the one or more parameters of the second probe in the control, wherein:

a dimension of the workpiece-sensing probe is used to set a datum position or offset parameter of the toolsetting probe, and a trigger signal from the toolsetting probe is used to set the datum position or offset parameter of the toolsetting probe from the dimension of the workpiece-sensing probe.

14. The method according to claim 13, wherein a length dimension of the workpiece-sensing probe is measured and used to pre-position the toolsetting and workpiece-sensing probes relative to each other before they are moved into the sensing relationship.

15. The method according to claim 13, wherein the probing direction is a Z-axis direction of the workpiece-sensing probe.

16. A method of calibrating or datuming probes on a machine tool, the machine tool comprising:

a first part on which a workpiece is mountable;

a second part on which a tool is mountable, the first and second parts being movable relative to each other;

a control which controls the relative movement of the first and second parts of the machine tool;

a toolsetting probe mountable on the first part; and a workpiece-sensing probe mountable on the second part;

the method comprising:

moving the first and second parts of the machine tool relative to each other to bring the toolsetting and workpiece-sensing probes into a sensing relationship with each other in a probing direction, a dimension or position of a first one of the probes being used to set one or more parameters of a second one of the probes in the probing direction; and storing the one or more parameters of the second probe in the control, wherein:

a dimension of the workpiece-sensing probe is used to set a datum position or offset parameter of the toolsetting probe, and a trigger signal from the workpiece-sensing probe is used to set the datum position or offset parameter of the toolsetting probe from the dimension of the workpiece-sensing probe.

17. The method according to claim 16, wherein a length dimension of the workpiece-sensing probe is measured and used to pre-position the toolsetting and workpiece-sensing probes relative to each other before they are moved into the sensing relationship.

18. The method according to claim 16, wherein the probing direction is a Z-axis direction of the workpiece-sensing probe.

* * * * *